United States Patent

[11] 3,627,979

| [72] | Inventor | Joseph F. Quaas<br>Island Park, N.Y. |
|---|---|---|
| [21] | Appl. No. | 22,008 |
| [22] | Filed | Mar. 23, 1970 |
| [45] | Patented | Dec. 14, 1971 |
| [73] | Assignee | Eutectic Corporation<br>Flushing, N.Y. |

[54] WELDING ELECTRODE
6 Claims, No Drawings

[52] U.S. Cl. ..................................................... 219/146
[51] Int. Cl. ...................................................... B23k 35/22
[50] Field of Search........................................... 219/145,
146, 73, 76; 117/202, 203, 204, 205, 206, 207;
148/24, 26

[56] References Cited
UNITED STATES PATENTS

| 1,942,364 | 1/1934 | Rood............................. | 219/146 |
| 3,215,809 | 11/1965 | Morimoto et al............. | 219/146 X |
| 3,345,495 | 10/1967 | Quaas et al.................. | 219/146 |

*Primary Examiner*—J. V. Truhe
*Assistant Examiner*—Lawrence A. Rouse
*Attorney*—Gladstone H. Kapralos

ABSTRACT: This invention relates to a welding electrode for depositing a highly wear-resistant surface layer upon a base metal. The welding electrode has a core made up with a mild steel sheath filled with tungsten carbide, chromium, manganese, ferrosilicon, calcium and silicon. A reaction-type flux coating is disposed on the core.

WELDING ELECTRODE

Heretofore it has been known that good impact and wear-resistance properties can be had from welding electrodes that can deposit relatively high carbide densities. However, modern industrial applications continue to demand welding consumable products that can provide alloy deposits capable of greater and greater resistance to wear. Various welding rods have been proposed to provide for this industrial need. However, most of these rods not only have not been able to provide weld deposits with the required wear-resistant properties but many also had other undesirable characteristics such as high hardness that made the weld deposit unsuitable for most applications.

It is the general object of the present invention to provide a welding electrode capable of depositing on a base metal an alloy deposit with appreciably greater wear-resistant properties.

In accordance with the invention, a core is provided. The core comprises an outer metallic sheathing such as a mild steel alloy or a nickel base alloy or a cobalt base alloy or a high alloy steel filled with an internal fill.

The fill is the most important element of the electrode. The fill comprises a heterogeneous mixture of carbide and alloy powders which upon weld deposition inter-react to provide a weld deposit alloy composition with the required high wear-resistant properties. After exhaustive experimentation it was found that surprisingly certain alloying agents, even though well capable of precipitating the formation of intermetallic carbides, under particular distributions, will not appreciably increase the wear resistance of the alloy deposit. Still further, it was discovered that certain metallic fluxing aiding agents are particularly suited in aiding in the formation of precipitated intermetallic carbides with especially good wear-resistant properties.

Accordingly, the fill of the core for the present invention comprises the following constituents in the weight percentages indicated:

FILL

| Constituent | Broad Range | Percent Weight Preferred Range | Example |
| --- | --- | --- | --- |
| Chromium | 6 to 25 | 8 to 20 | 9 |
| Intermetallic carbide-forming metals | 0 to 20 | 0 to 15 | 9.5 |
| Manganese | 0 to 4 | 0.05 to 3 | 0.1 |
| Ferrosilicon | 0.01 to 7 | 0.05 to 4 | 0.2 |
| Calcium | 0 to 5 | 0.01 to 3.5 | 0.01 |
| Silica | 0 to 4 | 0.01 to 3 | 0.01 |
| Refractory carbides | 25 to 93 | 45 to 90 | 81.0 |

It will be understood by those skilled in the art that the fill constituent elements are provided in powder form as for example particles finer than 25-mesh size. It will also be understood that several of the elements can be provided in a combined alloy form such as for example an alloy of chromium, iron and silicon.

The percentages of fill by weight as it compares to the total weight of core is as follows:

| | Broad Range | Percent by Weight Preferred Range | Example |
| --- | --- | --- | --- |
| Sheathing | 27 to 80 | 43 to 65 | 75 |
| Fill | 20 to 63 | 35 to 57 | 35 |

Examples of intermetallic carbide-forming metals are tungsten, chromium, titanium, and vanadium.

Examples of refractory carbides are chromium carbide, tungsten carbide, titanium carbide and vanadium carbide.

Disposed on the core is a reactive flux coating. The flux coating serves a number of functions, the most important of which are to prevent the deterioration of the fill refractory carbides during weld deposition, to provide good surface wetting and weldability properties to the electrode, to facilitate the formation of intermetallic carbides and to supply additional carbide-forming agents.

An example of a well-suited example of a reactive flux coating is as follows (also recited in U.S. Pat. No. 3,272,963 issued to Dr. Rene D. Wasserman et al. on Sept. 13, 1966):

| Constituent | Percent by Weight Range | Example |
| --- | --- | --- |
| Active metal fluoride, such as calcium potassium and sodium | 5 to 35 | 17 |
| Carbon | 2 to 35 | 15 |
| Alkaline earth metal carbonates such as borium and strontium | 20 to 70 | 33.5 |
| Metallic powder such as chromium, titanium, vanadium, columbium, molybdenum, aluminum and silicon | 5 to 60 | 31.5 |
| Chromium Oxide | 1 to 5 | 4.0 |

The percent flux coating by weight as compared to the weight of the core is as follows:

| | Percent by Weight Range | Example |
| --- | --- | --- |
| Flux coating | 20 to 50 | 39 |
| Core | 40 to 80 | 61 |

It will be understood by those skilled in the art that the electrode of the present invention can be manufactured by a number of methods known in the art such as for example a mild steel tube can be filled by gravity with the fill and the flux coating can be installed on the tube by a standard extrusion method. A suitable binder as is well known in the art, is mixed with the flux-coating constituents to aid the flux coating to adhere to the core.

Electrodes of the present invention have been found to weld deposit on base metals alloy deposits with remarkably good wear-resistant properties. In standard dry abrasion tests for a duration of 30 minutes on 4 inch diameter 1 inch long specimens of weld deposits of the present invention and weld deposits of the best known electrodes directed for abrasion-resistance applications, the abrasion resistance of the weld deposits of the electrodes of the present invention was better than two to one better than the prior art.

The following table outlines typical data from the wear tests. The inclusion of data from equivalent mild steel specimens is included for comparison purposes.

| Specimen makeup | Weight in grams lost by 4" diameter × 1" specimen in 30-minute dry abrasion test |
| --- | --- |
| Invention electrode | 0.01221 gram |
| Prior art electrode now utilized for abrasion applications | 0.02736 gram |
| Mild steel electrode | 0.09209 |

Still unexpectedly, but advantageously, deposits of the present invention had a hardness factor in the range of Rockwell C scale 58 whereas the hardness factor range of the prior art abrasion-resistant weld deposits was Rockwell C scale 61.

It will now be understood by those skilled in the art that the electrodes of the present invention provide weld deposits with remarkably improved wear-resistance properties while maintaining other good welding properties such as weldability.

I claim:

1. A welding electrode comprising a core; and a flux coating disposed on said core; said core having an outer metallic hollow sheath and a fill disposed in said sheath; said fill comprising the following constituents in the weight percentages indicated;

| Constituent | Percent Weight Broad Range |
| --- | --- |
| Chromium | 6 to 25 |
| Intermetallic carbide-forming metals | 0 to 20 |
| Manganese | 0 to 4 |
| Ferrosilicon | 0.01 to 7 |
| Calcium | 0 to 5 |
| Silica | 0 to 4 |
| Refractory carbides | 25 to 93 |

2. The welding electrode of claim 1 wherein said fill comprises the following constituents in the weight percentages indicated:

| Constituent | Percent Weight Preferred Range |
| --- | --- |
| Chromium | 8 to 20 |
| Intermetallic carbide-forming metals | 0 to 15 |
| Manganese | 0.05 to 3 |
| Ferrosilicon | 0.05 to 4 |
| Calcium | 0.01 to 3.5 |
| Silica | 0.01 to 3 |
| Refractory carbides | 45 to 90 |

3. The welding electrode of claim 2 wherein said metallic hollow sheath is an alloy taken from the group consisting of nickel base alloys, high alloy steels, mild steel alloys and cobalt base alloys.

4. The welding electrode of claim 2 wherein said intermetallic carbide-forming metals are taken from the group consisting of tungsten, chromium, titanium and vanadium.

5. The welding electrode of claim 2 wherein said refractory carbides are taken from the group consisting of chromium carbide, tungsten carbide, titanium carbide and vanadium carbide.

6. The welding electrode of claim 2 wherein said core comprises 37 to 80 percent sheathing and 20 to 63 percent fill by weight.

* * * * *